United States Patent [19]

Kovarik

[11] Patent Number: 5,479,497
[45] Date of Patent: Dec. 26, 1995

[54] AUTOMATIC CALL DISTRIBUTOR WITH PROGRAMMABLE WINDOW DISPLAY SYSTEM AND METHOD

[76] Inventor: Karla Kovarik, 416 Westglen Dr., Naperville, Ill. 60565

[21] Appl. No.: 237,970

[22] Filed: May 4, 1994

Related U.S. Application Data

[63] Continuation of Ser. No. 976,131, Nov. 12, 1992, abandoned.

[51] Int. Cl.$^6$ .............................. H04M 3/00; H04M 3/22; H04Q 3/64
[52] U.S. Cl. .................. 379/265; 379/34; 379/309; 395/158
[58] Field of Search .................. 395/100, 158; 379/265, 266, 309, 34, 204; 345/173

[56] References Cited

U.S. PATENT DOCUMENTS

| | | | |
|---|---|---|---|
| 4,414,628 | 11/1983 | Ahuja | 395/158 |
| 4,484,302 | 11/1984 | Cason | 395/158 |
| 4,542,376 | 9/1985 | Bass | 395/158 |
| 4,653,090 | 3/1987 | Hayden | 379/204 |
| 4,819,189 | 4/1989 | Kikuchi | 395/158 |
| 4,893,301 | 1/1990 | Andrews | 379/309 |
| 4,951,310 | 8/1990 | Honda | 379/309 |
| 4,954,818 | 9/1990 | Nakane | 395/158 |
| 4,991,199 | 2/1991 | Parekh | 379/97 |
| 5,001,469 | 3/1991 | Pappas | 395/158 |
| 5,001,710 | 3/1991 | Gawrys | 379/201 |
| 5,008,927 | 4/1991 | Weiss | 379/98 |
| 5,072,412 | 12/1991 | Henderson | 395/158 |
| 5,101,365 | 3/1992 | Westberg | 395/158 |
| 5,101,425 | 3/1992 | Darland | 379/34 |
| 5,129,055 | 7/1992 | Yamazaki | 395/158 |
| 5,153,909 | 10/1992 | Beckle | 379/265 |
| 5,179,655 | 1/1993 | Noguchi | 395/158 |
| 5,185,858 | 2/1993 | Emery | 395/158 |
| 5,191,644 | 3/1993 | Takeda | 395/158 |
| 5,233,687 | 8/1993 | Henderson | 395/158 |
| 5,241,656 | 8/1993 | Loucks | 395/158 |
| 5,253,340 | 10/1993 | Inoue | 395/158 |

OTHER PUBLICATIONS

ACD, A Communications Management Product Published by DataPoint in Mar. 1983.

*Primary Examiner*—Jeffery A. Hofsass
*Assistant Examiner*—Harry S. Hong

[57] ABSTRACT

An automatic call distributor (10) having a multiport switch (12) controlled by a central processing unit (14) for interconnecting external telephonic units (20) of an external telephonic network (22) with internal telephonic units (18) of the call distributor (10) and a data display terminal (32) coupled with the automatic call distributor and having a display screen (34) employing a programmable window display system and method of establishing a priority for a plurality of different types of information stored (40'–48') for display at a plurality of different window areas (40–48) and in which the priority of the window areas (40–48) controls a selectable order in which nonactive window areas (40–48) overlap on the display screen when there is insufficient room on the screen (36) for full simultaneous display of an active window area and all the nonactive window areas.

23 Claims, 12 Drawing Sheets

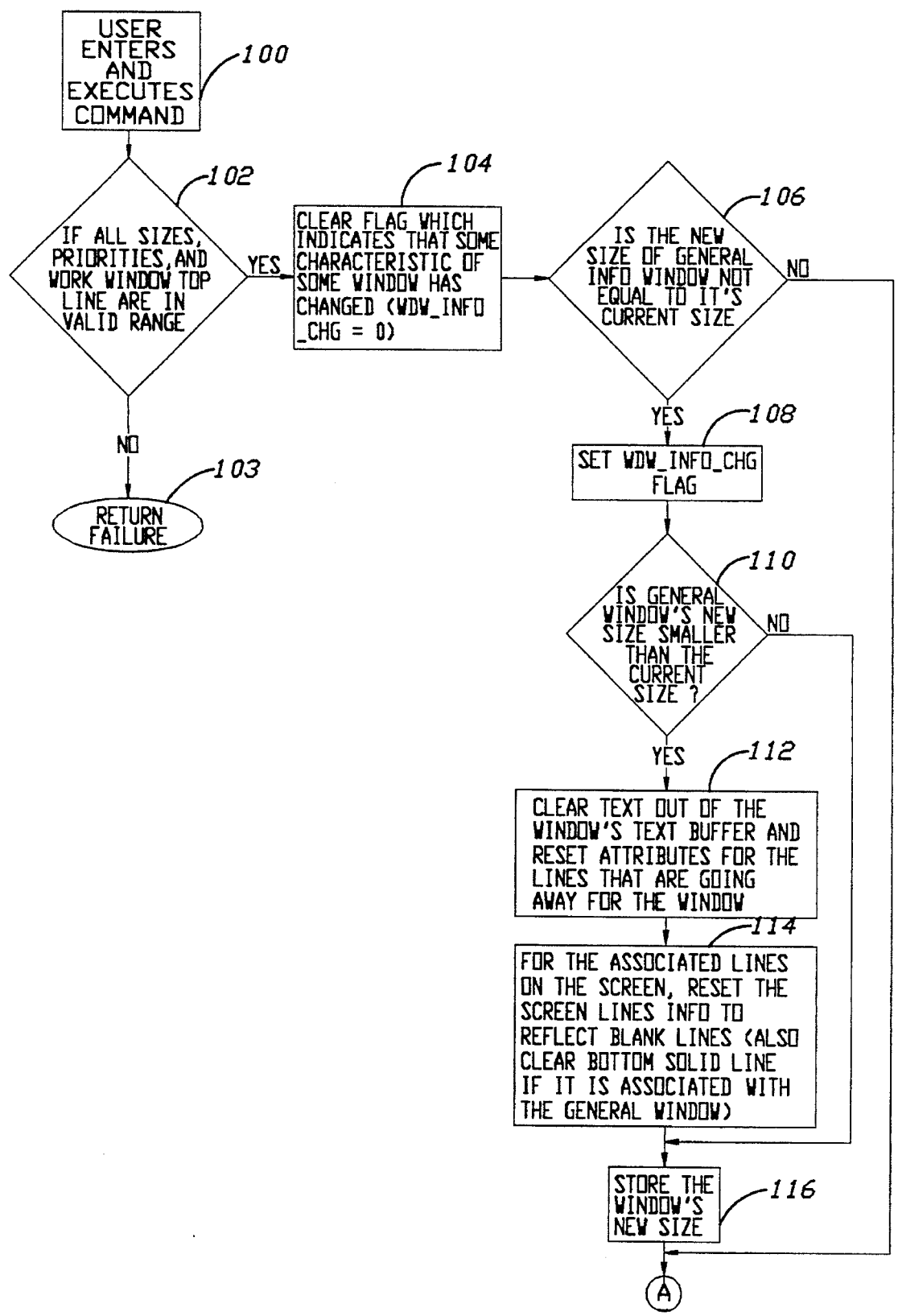

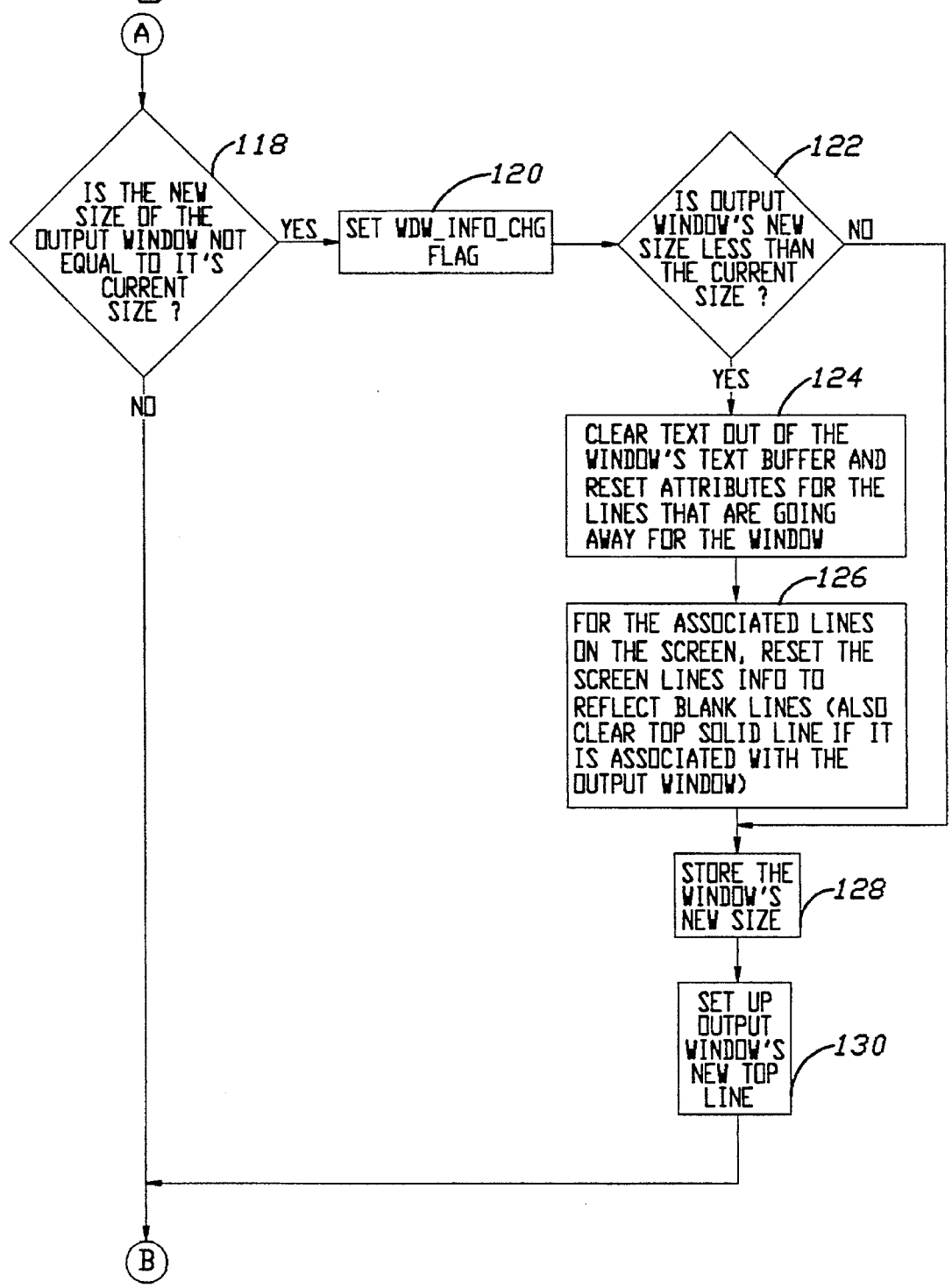

AUTOMATIC CALL DISTRIBUTOR WITH PROGRAMMABLE WINDOW DISPLAY SYSTEM AND METHOD

This application is a continuation of application Ser. No. 07/976,131, filed Nov. 12, 1992, now abandoned.

BACKGROUND OF THE INVENTION

1. Field of the Invention

This invention relates to an automatic call distributor and, more particularly, to an automatic call distributor with a display terminal and means and methods for controlling the display terminal for simultaneous display of a plurality of different types of information concerning the distributor.

Description of the related art including information disclosed under 37 CFR 1.97–1.99

Automatic call distributors employing a multiport switch controlled by a central processing unit for interconnecting external telephonic units of an external telephonic network with internal telephonic units used in the implementation of telemarketing are well known. Examples of such automatic call distributor systems are shown in patent applications U.S. Ser. No. 07/770,197 of Jones et al. entitled "Multichannel Telephonic Switching Network With Different Signaling Formats and Connect/PBX Treatment Selectable For Each Channel", filed Oct. 2, 1991, now U.S. Pat. No. 5,268,903, issued Dec. 7, 1993; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992 and U.S. Pat. No. 5,127,004 of Lenihan et al. entitled "Tone and Announcement Message Code Generator for a Telephonic Switching System and Method" issued Jun. 30, 1992.

It is also known in such automatic call distributors to employ a data display terminal having a data display for providing visual information to management and supervisory personnel concerning different aspects of activity within the automatic call distributor. This visual information includes the performance status of telemarketing agents located at the internal telephonic units of the call distributor. The agents service calls from customers calling from external telephonic units of an external telephonic network. A user or supervisor stationed at a data display terminal monitors the progress of the agents servicing the incoming calls and the status of certain telephonic trunks within the call distributor. By monitoring the call distributor, a supervisor at a data display terminal is better able to determine which agents are receiving certain types of customer calls, which agents are idle for long periods of time and which agents are unavailable to receive customer calls. This allows the supervisor to understand the call activity within the call distributor and to make the necessary changes (such as assigning a particular agent to service different types of calls) for a more efficient telemarketing operation.

In the known systems, the display screens at the data display terminal is divided into separate areas or windows for display of different types of information. For example, one window is used to display agent status; another window is used to display information concerning commands entered by the user at the data display terminal, and another window displays the actual command inserted at the terminal. These designated areas, or windows, are assigned various sizes for display of information on the screen. The supervisor, or other user, through means of the keyboard at the data display terminal activates a particular window for full display of the particular window in the forefront of the display screen. This activated, or active, window, depending upon size, entirely or partially overlaps the other nonactive windows which appear to be in the background of the screen. Information displayed in the background for the inactive windows that are only partially overlapped by the active window are readable to the user at the display terminal. Simultaneous visual access to the information in the nonactive windows is useful towards maintaining the efficiency of the automatic call distributor.

Disadvantageously, in these known systems the user of the data display terminal cannot control which nonactive windows partially or entirely overlap other nonactive windows. Many times a supervisor must activate a particular window, but also needs to receive information displayed in the background of another window. In the known data display systems, the user or supervisor has no control over which nonactive windows overlap or are displayed over the other nonactive windows. Accordingly, the user in many situations is unable to receive certain information from a particular nonactive window while certain other windows are activated. These circumstances force the users to change from one active window to another in order to obtain the desired information sequentially, instead of obtaining it simultaneously, with resultant increased risk of erroneous readings and inefficiency.

SUMMARY OF THE INVENTION

Accordingly, it is the principal object of the present invention to provide an automatic call distributor having a data display terminal which overcomes the disadvantages of known call distributors by providing a system and method for selectively programming priorities of nonactive window areas at the data display terminals, themselves, for enhanced flexibility and utility.

This object is achieved in part through provision of an automatic call distributor having a multiport switch controlled by a central processing unit for interconnecting external telephonic units of an external telephonic network with internal telephonic units of the call distributor and a data display terminal with a display screen coupled with the automatic call distributor for displaying information concerning automatic call distributor activities, a programmable data window display system comprising means for storing a plurality of different types of information for display, means for selectively displaying the different types of information at different active and nonactive window areas of the display screen, means for establishing a priority for said plurality of windows and means at the display terminal for selectively changing the priority of the window areas to control a selectable order in which the nonactive window areas overlap on the display screen when there is insufficient room on the screen for full simultaneous display of the active window area and all the nonactive window areas.

The object is also achieved in part by providing in conjunction with an automatic call distributor having a multiport switch controlled by a central processing unit for interconnecting external telephonic units of an external telephonic network with internal telephonic units of the call distributor and a data display terminal with a display screen coupled with the automatic call distributor for displaying information, with a method of selectively programming the display of data windows, comprising the steps of (1) storing a plurality of different types of information for display, (2) selectively displaying the different types of information at different active and nonactive window areas of the display screen, (3) establishing a priority for said plurality of windows and (4) selectively changing the priority of the window areas to control a selectable order in which the nonactive window areas overlap on the display screen when there is insufficient room on the screen for full simultaneous display of the active window area and all the nonactive window areas.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIGS. 5A–5E is a composite flow chart of a computer program stored in the peripheral data interface card memory of FIG. 4 and to update the characteristic information for each window of FIG. 3.

DESCRIPTION OF THE PREFERRED EMBODIMENT

Figure 1:
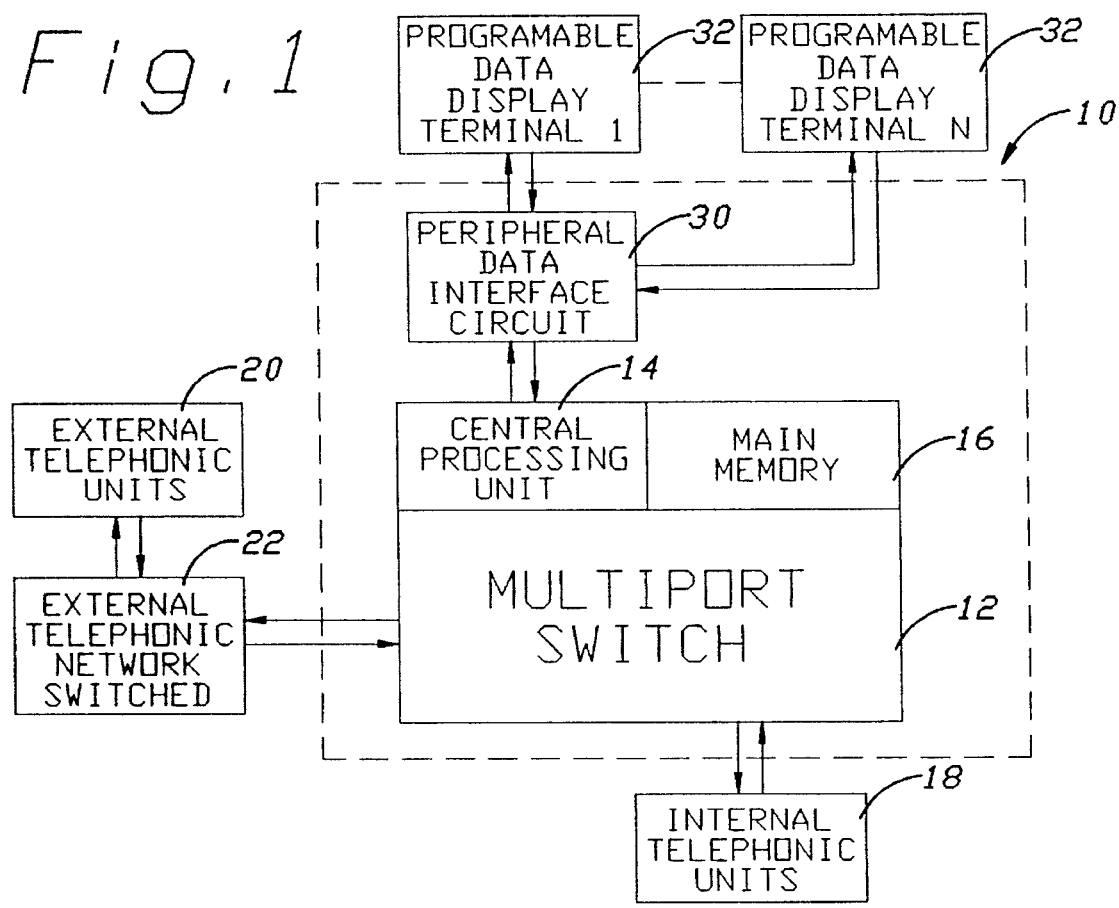
FIG. 1 is a functional block diagram of the preferred embodiment of the display programmable automatic call distributor of the present invention.

Referring to FIG. 1, a block diagram of the preferred embodiment of the display programmable automatic call distributor 10 is seen to include a plurality of 1-N data display terminals 32, a peripheral data interface 30 and a multiport switch 12 controlled by a central processing unit 14 in conjunction with a main memory 16 to selectively connect a plurality of internal telephonic units 18 with a plurality of external telephonic units 20 of an external telephonic switching network 22. The central processing unit 14, which controls call distribution functions, preferably comprises a Motorola 68030 microprocessor. Generally, while the display programmable, automatic call distributor 10 can be implemented in other ways and in different sizes except for the novel changes which will be explained below in detail, it is preferably an automatic call distributor of the type shown in U.S. patent application Ser. No. 07/770,197 of Jones et al. entitled "Multichannel Telephonic Switching Network With Different Signaling Formats and Connect/PBX Treatment Selectable For Each Channel" filed Oct. 2, 1991; U.S Pat. No. 5,140,611 of Jones et al. entitled "Pulse Modulated Self-Clocking and Self-Synchronizing Data Transmission and Method for a Telephonic Communication Switching System", issued Aug. 18, 1992 and U.S. Pat. No. 5,127,004 of Lenihan et al. entitled "Tone and Announcement Message Code Generator for a Telephonic Switching System and Method" issued Jun. 30, 1992, and reference should be made thereto for details.

The programmable display terminal 32 logically is coupled with the central processing unit 14 via a peripheral data interface (PDI) circuit, or card, 30. The data display terminal 32, FIG. 2, preferably has a cathode ray tube (CRT) for display screen, or other display screen, 34 for providing information concerning activity within the automatic call distributor 10, FIG. 1. The data display terminal 32 has an associated keyboard 36 for entry of commands, log-in, and other information carried to and processed by the PDI circuit 30, FIG. 1. Preferably, the data display terminal 32 is a model 4000 manufactured by Applied Digital Data Systems, Inc. a subsidiary of NCR Corporation.

Figure 2:
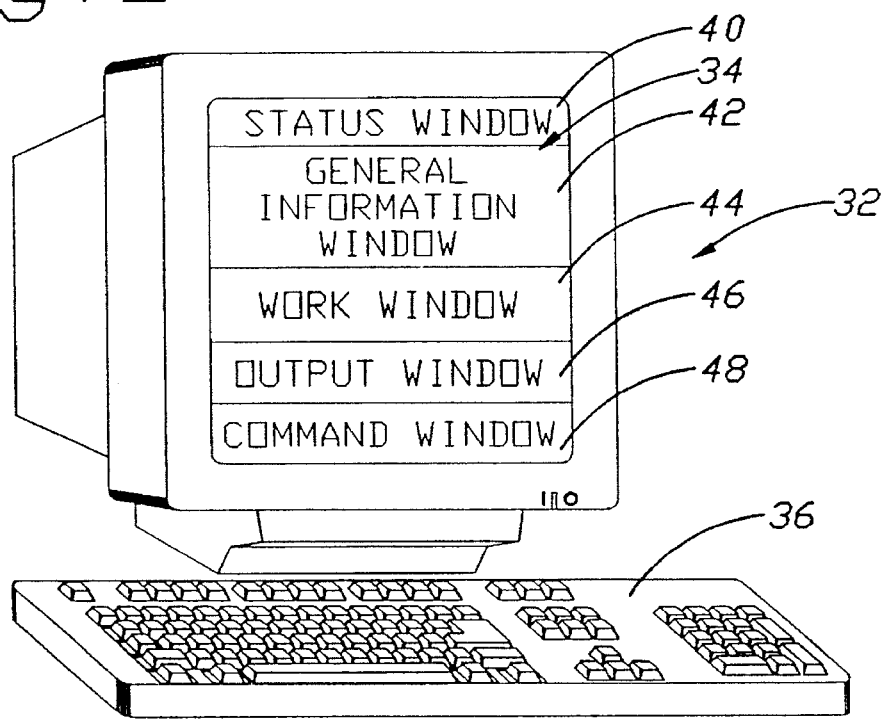
FIG. 2 is a view of a preferred form of the display programmable data display terminal shown in block form in FIG. 1.
Figure 4:
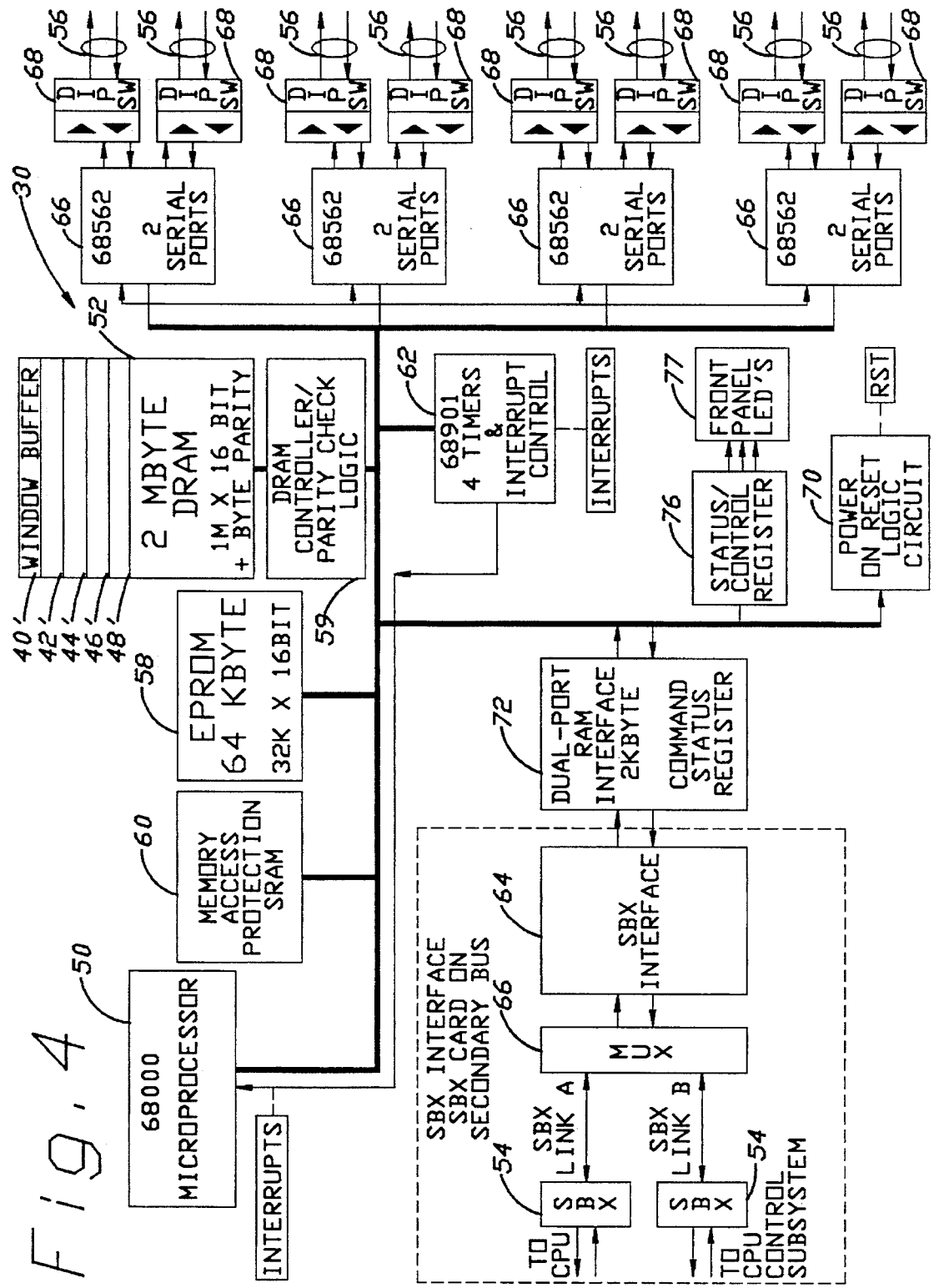
FIG. 4 is a function block diagram of the details of the peripheral data interface circuit shown in single block form in FIG. 1.

The peripheral data interface (PDI) circuit 30 includes a Motorola 68000 microprocessor 50 and a 2 Mbyte dynamic random access memory (DRAM) 52, FIG. 4, for control of the display screen functions of the data display terminal 32, FIG. 2. In response to power up of the peripheral data interface card 30, the operating software and window processing routines for control of the data display terminal is down loaded from the main memory 16 of the automatic call distributor 10 to the 2 Mbyte DRAM 52 at the PDI circuit 30. All changes to the display screen 34 are handled by the window processing routines stored in the memory 52, FIG. 4, of the PDI circuit 30. The window processing routines are described in detail with reference to FIGS. 5 and 6. Information displayed on the screen 34, FIG. 2, is stored in associated window memory buffers at the PDI DRAM memory 52, FIG. 4, with one or more buffers allocated for each separated area or window on the screen. Any changes to the display on one screen 34 result from corresponding changes to date in the associated buffer for the window being updated.

Figure 3:
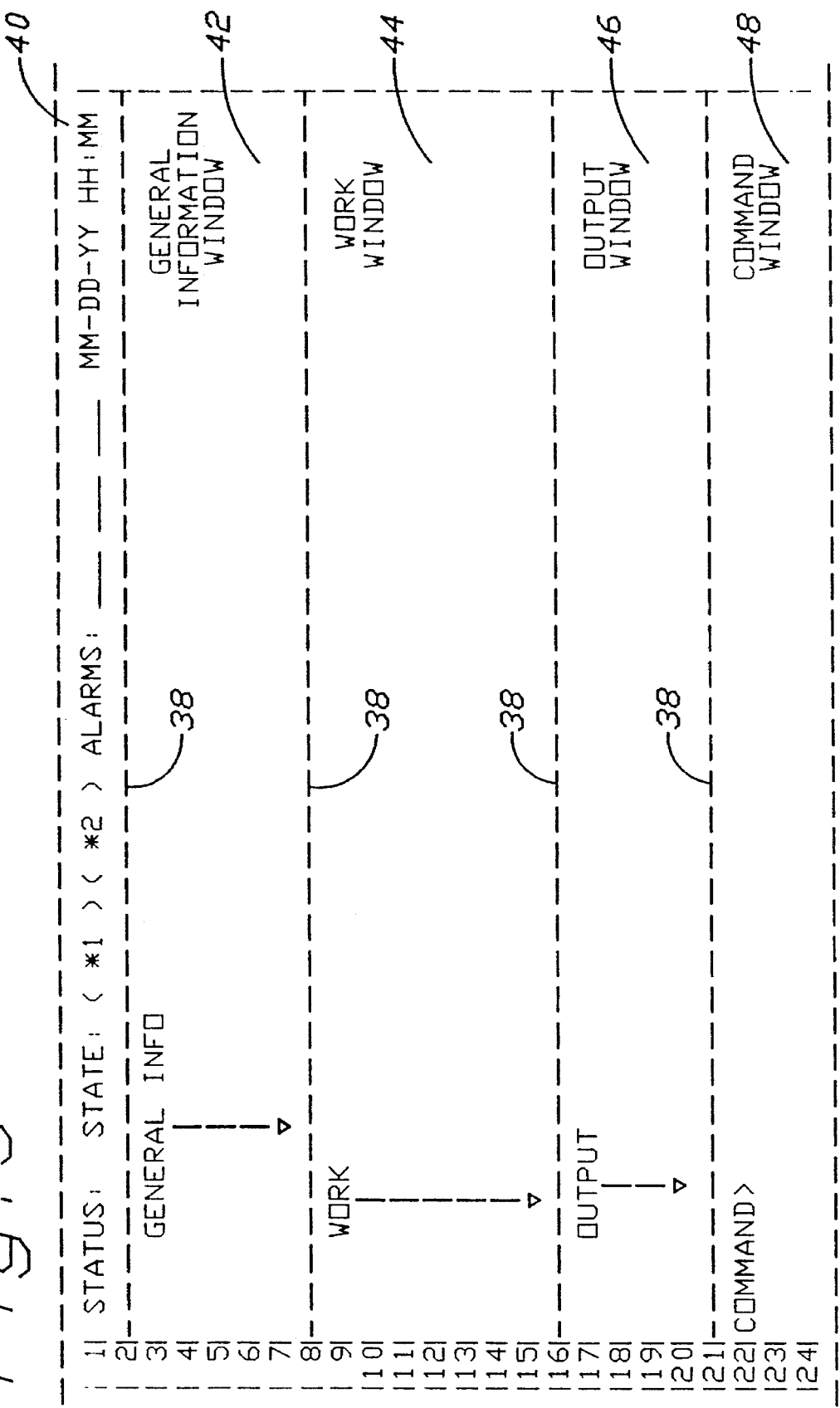
FIG. 3 is schematic illustration of the display screen of the data display terminal of FIG. 2 and the size and location range of the various windows that have their priority for display controlled by the data display terminal of FIG. 2 of the preferred embodiment.

Referring to FIG. 3, the display screen 34 of each of the programmable data display terminal 32 is separated into a plurality of areas, or windows, 40, 42, 44, 46 and 48. A plurality of memory buffers of the PDI circuit 30, FIG. 1, are allocated for each of the windows. In the preferred embodiment, the display screen 34 is comprised of twenty-four number lines, each having eighty character spaces in length. The display screen 34, FIG. 3, is divided into five reconfigurable areas, or windows, called: the status window 40, the general information window 42, the work window 44, the output window 46 and the input, or command, window 48. The user enters a command on the keyboard 36, FIG. 2, of the programmable data display terminal 32 to change the number of lines, or size, of the windows and the top line of the work window 44, FIG. 3, to reconfigure the format of the window display.

In order to obtain the object of the invention, the user can enter a command to the priority of each of the windows for enhanced flexibility in format reconfiguration tailored to the particular display needs of the user. A numeric value is entered and stored in the memory 52, FIG. 4, of the PDI circuit 30 for the window size designating the number of lines of the window and the top line of the work window 44. Another numeric value is entered and stored in another part of the associated buffer to designate the window priority level. The microprocessor 50, FIG. 4, of the PDI circuit 30 reads the numeric values for the size and priority of each window upon execution of the command and adjusts the window screen display 36, FIG. 3, format accordingly. The user can also enter a command to designate any one of the windows as the active window. In such case, all the other windows are nonactive. The programmable priority number of a nonactive window determines whether it will overlap another nonactive window on the display screen 34 when the size of the window does not permit full display of all windows. In such event, a nonactive window of a given priority will overlap all those windows of lower priority and will be overlapped by all windows of greater priority. In the preferred embodiment, the window priority levels are designated by priority numbers arranged in reverse numerical order with windows of higher priority having lower priority numbers. A window selected to be active, on the other hand, overlaps all other windows regardless of their relative priority.

When a user generates a command on the keyboard 36, FIG. 2, of the data display terminal 32 to activate one of the plurality of windows 40, 42, 44, 46 and 48, the PDI circuit 30, FIG. 4, reads the command, activates the window associated with the command and presents the activated window in the forefront of the display screen 34, i.e. it overlaps all other windows to the extent needed. Since an active window has priority over the other windows, regardless of the numeric priority of the other windows, in response to a window being activated upon user command, it is displayed on top of any window it overlaps. The other windows that are not activated, i.e. nonactive windows, if displayed in overlapping format are displayed according to their assigned numeric priority. The entire window size (every line) designated by the user is displayed in the forefront of the screen 34, FIG. 3, upon the window being activated. Each of the lines associated with the activated window is displayed and overlaps other windows regardless of the numeric priority level assigned to the other windows. Thus, an activation of a window provides for viewing the entire window size assigned by the user. As noted, the particular information or text which actually appears on the lines of the activated window are obtained from the associated buffers 40', 42', 44', 46' and 48' of the 2 Mbyte DRAM 52, FIG. 4, for is displayed in the forefront of the display screen 34, FIG. 2.

Referring to FIG. 3, in the preferred embodiment, the status window 40 displays information regarding the status of the user who signs-in on the data display terminal 32, FIG. 2; the general information window 42, FIG. 3, displays information regarding the status of telemarketing agents stationed at the internal telephonic units 18, FIG. 1, within the automatic call distributor 10; the work window 44, FIG. 3, displays user friendly information describing the various functions of an entered command; the output window 46 displays information in response to the execution of a command, and the command or input window 48 displays the command text entered at the terminal keyboard 36, FIG. 2, by the user.

In the preferred embodiment, the status window 40 is displayed on line one with a solid line 38 separating the status window 40 and the general information window 42 displayed at line two. The general information window 42 begins at line three. The command window 48 is the bottom window and extends from lines twenty-two to twenty-four. A solid line 38 is displayed at line twenty-one and separates the command or input window 48 from the output window 46. The general information window 42, the work window 44, and the output windows 46 are configurable by the user. These windows have both their window size and numeric priorities selectively changeable by the user in order to provide a desired screen display layout.

As noted, the layout of nonactive windows depends on the assigned priority for each window. For instance, if two windows are overlapping, the window with higher priority is displayed over the other window. A change in a window priority, size or top line results in a reconfiguration of the display screen 34, FIG. 3.

The priority number entered by the user determines which of the nonactive windows overlaps and is displayed over other windows. The microprocessor 50, FIG. 4, of the PDI circuit 30 reads the priority number stored in memory buffers 40'-48' of the DRAM 52 for each of the nonactive windows 40-48 and displays the lines outside of the active window which are assigned a lower priority number than windows having a higher priority number. A default priority is also established and stored in the memory 52 at the PDI circuit 30 for each window.

The default priority number is read by microprocessor 52 of PDI circuit 30 in response to the user assigning to the one window the same priority number as another window. In the preferred embodiment, the window having the lower default priority number overlaps the windows having higher default priority numbers.

Prioritizing windows at the display terminal allows the user to selectively view information in windows other than the active window in the background of the display screen 34, FIG. 3. For example, if the user desires to view information in the output window 46 while the general information 42 window is active, the user assigns a lower priority number for the output window 46 than for the work window 44 upon entering the window format change command. This command is the Ed_user_disp command in the preferred embodiment.

If the general information window 42 size is five lines extending from line 3 to line 7 on the display screen and the output window 46 has a window size of 12 lines long extending upward from line 20 to line 9, the output window 46 will completely overlap the work window 44, since the output window has priority over the work window. This allows the user to view information in the output window 46 when the general information window 42 is active. To view the work window 44 while the general information window 42 is active, a lower numeric priority is needed to be assigned for the work window upon entering the window format change command to give the work window priority and thus overlap the output window.

Each window type contains the following information stored in buffers 40'-48' FIG. 4: (a) the size of the window, (b) the top line of the display screen 34 on which the window appears, FIG. 3, (c) the numeric priority, (d) the numeric default priority, (e) a pointer to a buffer for the window in which the "text" displayed on the screen is stored, and (f) a pointer to a display "attribute" buffer which contains an attribute for each character in the text buffer. The "text" is the actual information in readable characters displayed on the screen 34, while the "attributes" describe the manner and appearance for most of the text on the screen.

Each line on the display screen 34 contains the following information stored in buffers 40'-48' FIG. 4: (a) a pointer into the associated text buffer of the window to select the text displayed on the screen 34, FIG. 2, (b) a pointer to the attribute associated with the text selected for display on the screen 34, (c) the numeric priority, or priority number, of the window having text displayed on the line, and (d) the type of window that has the text displayed on the associated line (i.e. status, general info, etc.).

Referring to FIG. 4, communication of the peripheral data interface circuit 30 with the central processing unit 14 and its control subsystem and main memory 16, FIG. 1, is through means of a Secondary Bus Extender (SBX) circuit, or card, 54. The central processing unit 14, FIG. 1, of the control subsystem is preferably a Motorola 68030 microprocessor based multiprocessor, distributed processing system which is capable of either simplex or duplex operation. The PDI circuit 30, FIG. 4, is provided access to higher level processing over the SBX busses.

In the preferred embodiment, the PDI circuit 30 provides the interface mechanism between the central processing unit 14, FIG. 1, and the data display terminal 32 and other peripheral devices such as modems, printers and data base computers (not shown). To provide flexible functionality, the PDI serial ports 56, FIG. 4, are selectively conditioned for any of the four standard interfaces: RS232C, RS422, RS423 and RS485. The PDI circuit 30 is microprocessor controlled, having a Motorola 68000 microprocessor 50 operating from a 10 MHz clock, and provides the overall controlling functions of the PDI circuit 30. The primary function of the microprocessor 30 is to coordinate data transfers between the central processing unit 14, FIG. 1, and the data display terminal 32. The microprocessor 50, FIG. 4, formats data destined for the data display terminals 32, FIG. 1, to thereby off load the higher level processors.

A 2 Megabyte Dynamic RAM 52, FIG. 4, memory device array (1 MX 16 bits+2 parity) provides memory for downloaded code space from automatic call distributor 10, FIG. 1, the main memory 16, data storage and scratch space. A 64 Kbyte EPROM 58, FIG. 4, is used for basic diagnostic and boot loader functions, since all the functional code for the PDI circuit 30 operation is downloaded from the main memory 16, FIG. 1, to the DRAM 52, FIG. 4, upon initialization of the PDI circuit 30. Memory access protection of the DRAM 52 is provided by a 256×4 static RAM 60 and allows write, fetch and supervisor protection capability over 4 Kbyte blocks of DRAM for software diagnostic purposes. The DRAM 52 integrity is checked through a DRAM controller 59 by parity bits over byte boundaries. A 68901 multifunction peripheral (MFP) 62 contains four eight bit timers, an interrupt prioritization/control function as well as a status register. Interrupts from all the various card functions are funneled into the 68901 multifunction peripheral (MFP) circuit 62 for prioritization and control. The MFP circuit 62 allows software configurable marking and vectoring of interrupts and provides a status register to indicate the current status of interrupts.

The SBX interface 64 provides demultiplexing from a multiplexer 66 of the multiplexed address and data signals coming from the SBX Card 54. Conversion of parity from SBX bus word boundaries to PDI circuit 30 byte boundaries is also necessary. Data card control message transfers occur through 2 Kbytes of dual-port RAM configured as a 1K word for the 68000 16 bit microprocessor 50.

The PDI circuit 30 has eight serial ports 56 implemented by four dual serial communication controllers (SCC) 66, preferably a DUSCC Model 68562. Each 68562 SCC provides two independent ports 56. The ports 56 are connected to the data display terminals 32, FIG. 1, for transfer of data information. The serial link drivers and receivers of each port are switch-configurable for line operation via dip switches 68 of the PDI circuit 30. The power-on reset logic circuit 70 ensures a clean start-up of PDI functions. The logic circuit 70 accepts a reset command via the dual-port RAM interface 72 from the SBX card 54. A status control register 76 has three front panel LED's 77 which are used to visually indicate general board status. The LED's are controlled by the microprocessor 50 through an addressable latch.

While the advantages of the invention are preferably obtained with the automatic call distributor 10 described above with reference to FIG. 1, the method of the invention can be practiced with any other automated call distributor having a multiport switch controlled by a central processing unit in conjunction with a main memory for selectively interconnecting a plurality of external telephonic units of an external telephonic network to a plurality of internal telephonic units of the call distributor and a data display terminal coupled with the automatic call distributor for displaying information concerning automatic call distribution activities. In any event, the steps of the preferred method of practicing the invention comprise the steps of (1) storing a plurality of different types of information for display, (2) selectively displaying the different types of information at different window areas of the display screen, and (3) selectively changing prioritization of the window areas to control a selectable order in which the window areas overlap each other when there is insufficient room on the screen for simultaneously full display of at least two of the plurality of windows.

Referring to FIGS. 5A–5E and 6A–6D, the memory 52, FIG. 4, of the peripheral data interface card contains the computer programs to achieve the various functions of the invention described above. These are flow charts for the preferred computer program stored in the PDI memory 52 of FIG. 4. The hi_upd_wdwinfo routine described in FIGS. 5A–5E provides the method of the preferred embodiment to handle updates to window information resulting from a window size change, priority change and top line change. The hi_upd_wdwinfo routine updates the information for each window and displays the reflected changes on the display screen 34, FIG. 2, of the data display terminal 32. In step 100 of FIG. 5A, the user at the data display terminal 32 enters a command on the keyboard 36 to change the display format on the display screen 34. In the preferred embodiment, this command is the ED_USER_DISP command in which values for a change in a window priority, window size and the top line of the work window 44, FIG. 3, are entered and the command is executed. Before any modification is done to the layout of a window, all possible changes must be validated to ensure the changes are within the predetermined parameters for each window. For example, if a user enters a window size of thirty lines, an error will occur since the screen 34 contains a maximum of twenty-four lines. In step 102, FIG. 5A, the PDI circuit 30 determines if all the sizes, priorities, and the top line for the work window 44 are in valid range. If any of this information is invalid, then in step 103, FIG. 5A, the hi_upd_wndwinfo routine returns with a failure status, leaving the screen format unchanged.

If all the changed window sizes, priorities and the top line of the work window 44, FIG. 3, are in valid range, then in step 104, FIG. 5A, the WDW_INFO_CHG flag is cleared to indicate if a characteristic of a window is changed or remains the same. In step 106, the PDI circuit 30 determines if there has been any entered changes to the size of the general information window 42, FIG. 3. If the general information window 42 is equal to its current size, then the hi_upd_wdwinfo routine processes the changes to the output window 46, FIG. 3, in step 118, FIG. 5B. If the general information window size changed, then in step 108, FIG. 5A, the WDW_INFO_CHG flag is set to indicate a change in a parameter of a window. In step 110, the hi_upd_wdwinfo routine determines if the size of the general information window is smaller than its current size. This check is made to determine if the window size is shrinking. If the window size is smaller, then the area in the character information buffer in the PDI memory 52, FIG. 4, corresponding to the lines being lost due to resizing are set up with spaces.

The attribute information for the removed lines are set up to "default" state. Blank lines (lines not within a window) are displayed on the display screen 34, FIG. 3. If the size is not smaller, then the size for the general information window 42 is larger, and the changed new size is stored in the associated memory buffer in the DRAM 52, FIG. 3, of the PDI circuit 30. If the size is smaller than the current size, then in step 112, FIG. 5A, the text is cleared out of the text buffer for the general information window 42 and the attributes are reset for the display lines that are being removed from the window. The attributes, as noted, are used to determine how a character is displayed on the display screen 34, FIG. 3, the text is the actual data characters displayed on the screen. In step 114, FIG. 5A, the information for the lines on the screen associated with the general information window are reset to reflect the display of blank lines. The bottom solid line is cleared if it is associated with the general information window. In step 116, the new size of the general information window 42 is stored in the memory 52, FIG. 3, of the PDI circuit 30.

Figure 5C:
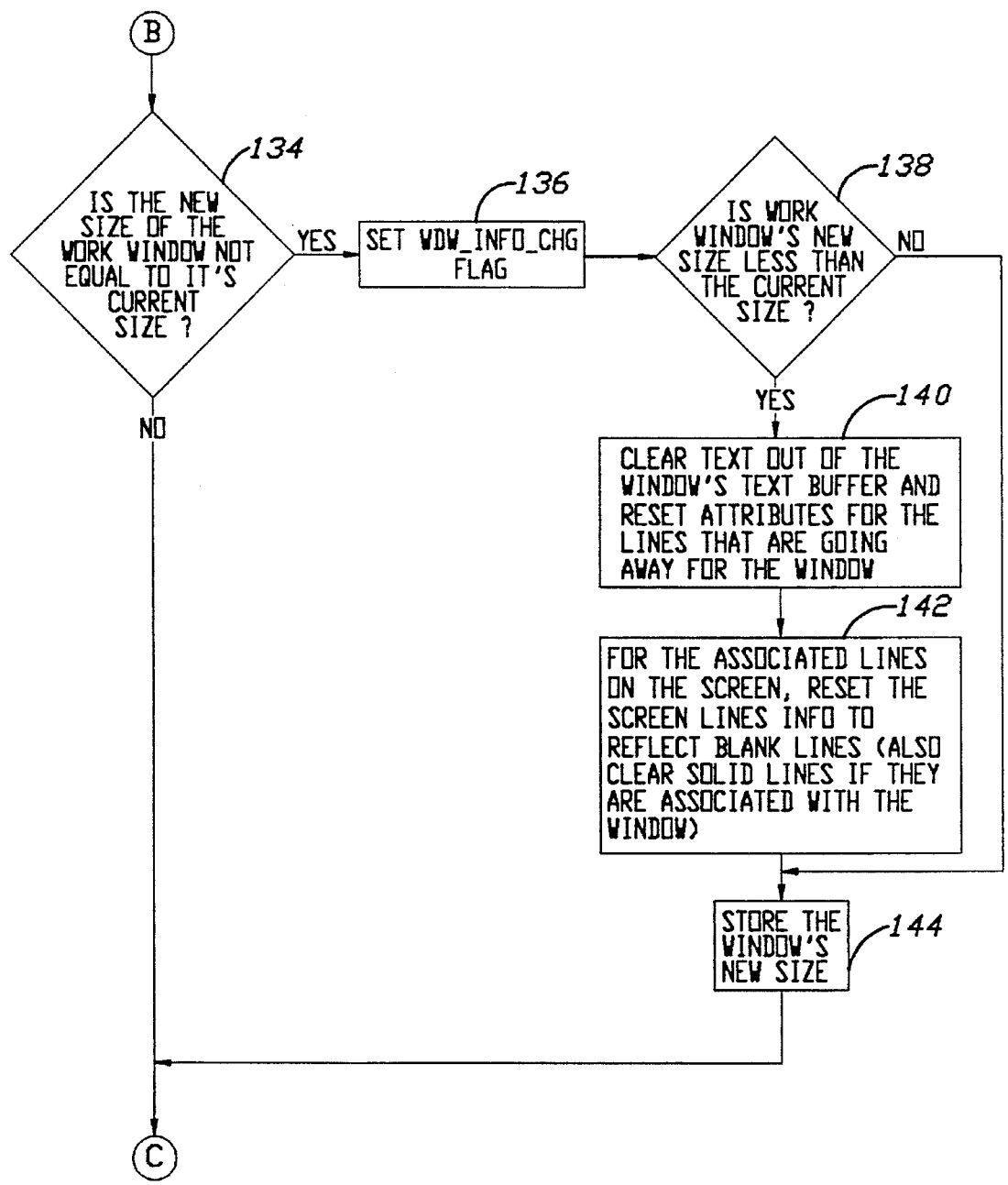

In step 118, of FIG. 5B, the hi_upd_wdwinfo routine determines if the size of the output window 46, FIG. 3, has changed. If the new size is equal to the current size of the output window 46, then the routine will move to step 134, FIG. 5C, to process the work window. If the new size of the output window 46 is not equal to the capacity displaying output window, then in step 120, FIG. 5B, the WDW_INFO_CHG flag is set to indicate a change in the output window parameters. In step 122, the hi_upd_wdwinfo routine determines if the size of the output window is less than the current size. If the new size is not less than the current size, then in step 128 the new or entered size of the window is stored in the memory 52 of the PDI circuit 30, FIG. 4.

If the entered size parameter of output window 46, FIG. 3, is less than the current displayed size, then in step 124, FIG. 5B, the text in the text buffer for the output window 46, FIG. 3, and the attributes for the lines eliminated from the window are reset. Likewise, in step 126, FIG. 5B, the information for the lines associated with the screen is reset to reflect blank lines, and the top solid line is cleared if it is associated with the output window. In step 128, FIG. 5B, the newly entered size for the output window 46, FIG. 3, is stored at the PDI circuit 30, FIG. 4, memory 52. In step 130, FIG. 5B, the top line for the output window is calculated by the PDI circuit 30, based on the entered size, and then is prepared for display.

In step 134, of FIG. 5C, a determination is made as to whether the size entered by the user for the work window 44, FIG. 3, is equal to its currently displayed size. If the new size of the work window 44 is the same as the current size, then no change to the number of lines has been entered for the work window 44 and the hi_upd_wdwinfo routine goes to step 150, FIG. 5D, to determine if there is any change to the top line of the work window. If the new size of the work window 44, FIG. 3, is not equal to its current size, then in step 136, FIG. 5C, the WDW_INFO_CHG flag is set. In step 138, the routine determines if the new size of the work window is less than the current size. If the size of the window is not less than the current size, then in step 144 the new size of the work window is stored in the PDI memory 52, FIG. 4.

If the entered size of the work window is changed to a smaller size, then in step 140 the text is cleared out of the text buffer in the PDI memory 52, FIG. 4, for the working window 44, FIG. 3, and the attributes for the lines which are removed from the window are reset. In step 142, FIG. 5C, the information on the lines associated with the display screen 34, FIG. 3, is reset to reflect blank lines and the solid lines 38 are cleared if they are associated with the work window 44. In step 144, the entered size for the work window is stored in the PDI memory 52, FIG. 4.

Figure 5D:
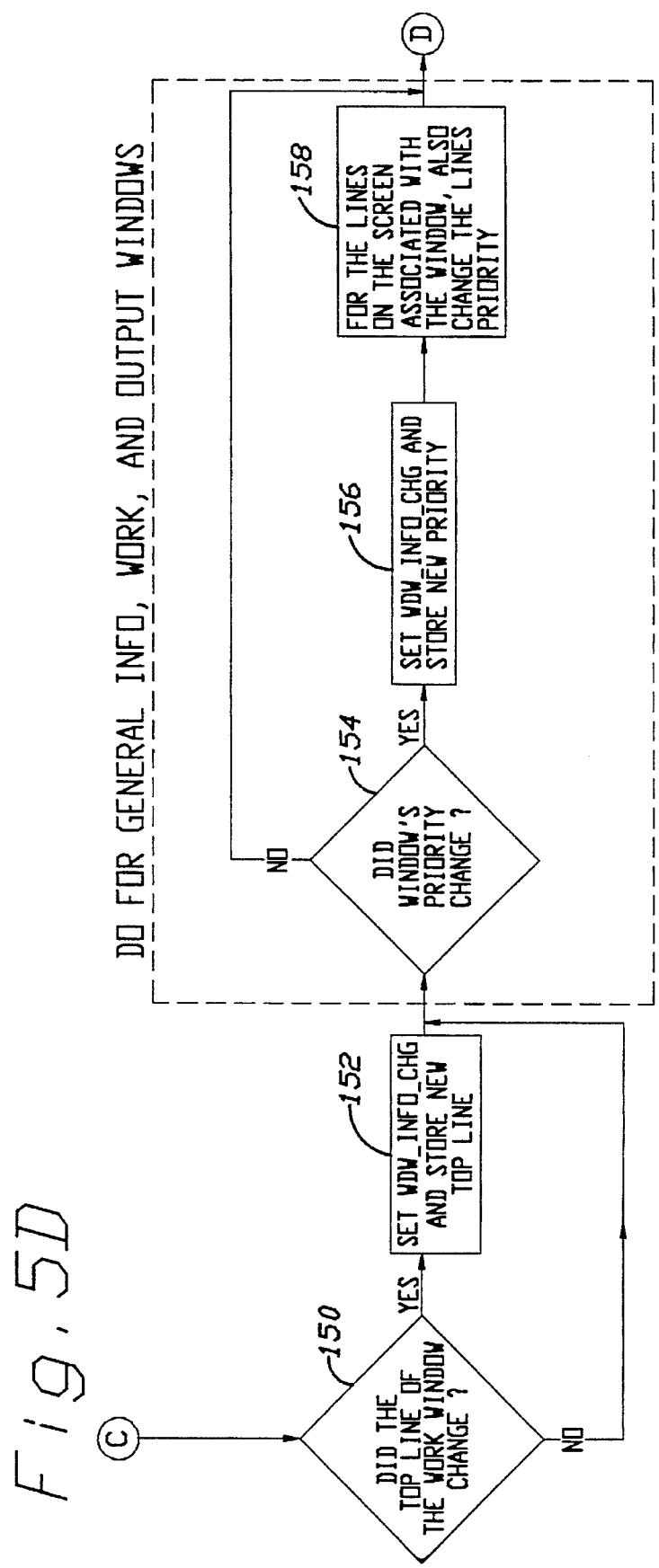

Referring to FIG. 5D, in step 150 the hi_upd_wdwinfo routine determines if the top line of work window 44, FIG. 3, is changed. If the top line for the work window 44 is not changed, then the routine proceeds to step 154, FIG. 5D, to determine the window priorities. If the top line of the work window 44, FIG. 3, does change, then in step 152, FIG. 5D, the WDW_INFO_CHNG flag is set and the new top line for the work window entered by the user is stored in the PDI memory 52, FIG. 4.

After the size determination is made for the general information 42, work 44 and output windows 46, FIG. 3, a determination is made as to any changes in the priorities for each of these windows (general information, work and output) in step 154, FIG. 5D. If no change was entered in the priority of a window, then the hi_upd_wdwinfo routine proceeds to step 160, FIG. 5E. If a change is entered in a window priority level, then in step 156, the WDW_INFO_CHG flag is set and the entered numeric priority is stored in the PDI memory 52, FIG. 4. In step 158, FIG. 5D, the priority for each line associated with the window is changed. If a priority number for a window changes, then each line associated with the window has its priority level changed. This is done since the line priority is used to determine the overlapping of windows. The window having lines with the lower priority number and higher priority overlaps those window lines having a higher priority number and lower priority as long as the line with the higher priority is not in the active window.

Figure 5E:
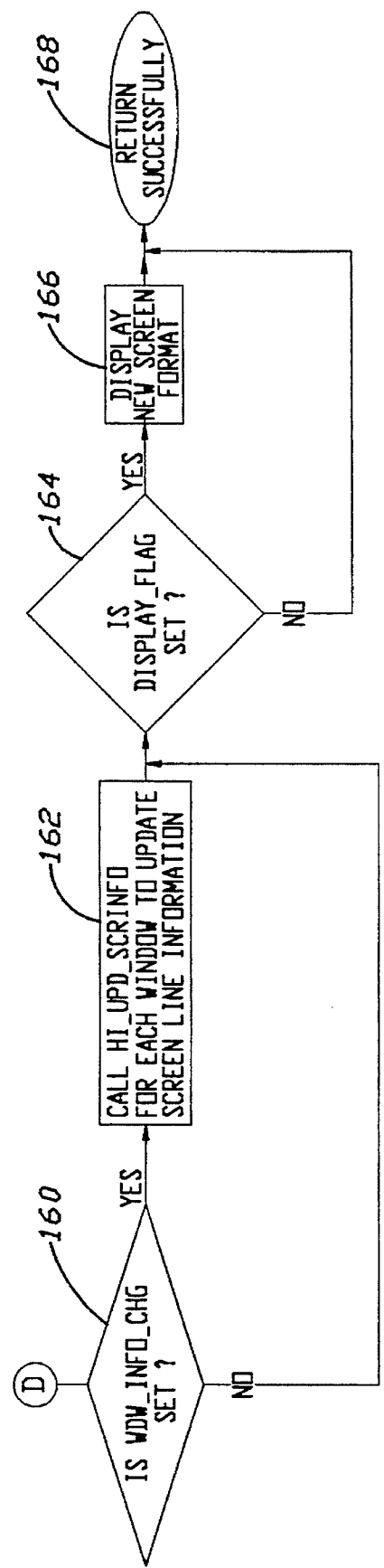

Referring to FIG. 5E, in step 160, the hi_upd_wdwinfo routine determines if the WDW_INFO_CHG flag is set, indicating that a change to a window size, to a window priority or to the top line of the work window is made. If the WDW_INFO_CHG is not set, then the routine proceeds to step 164 to determine if the display_flag is set. The display_flag indicates if the display screen 34, FIG. 3, is to be displayed with the changed screen format. If the WDW_INFO_CHG flag is set then in step 162, FIG. 5E, the hi_upd_wdwinfo routine calls the hi_upd_scrinfo routine described in FIGS. 6A–6D for each window to update the screen line information. The hi_upd_scrinfo routine in FIGS. 6A–6D sets up the information for display on the screen 34, FIG. 3, by updating all the line priorities, updates all the pointers for the text and makes all the changes that occur. In step 164, FIG. 5E, the hi_upd_wdwinfo routine determines if the display_flag is set. The display_flag is used to indicate if the display screen is to be redisplayed with the new parameters. If the display_flag is set, then in step 166 the changed screen layout is displayed at the display screen 34, FIG. 2, of the data display terminal 32. In step 168, the hi_upd_wdwinfo routine returns successfully.

Referring to FIGS. 6A–6D, the steps for the hi_upd_scrinfo routine are shown. This routine updates the information for each line on the display screen 34, FIG. 3. The information kept for each window type and read by the PDI circuit 30, FIG. 4, for the hi_upd_scrinfo routine includes: (a) the top line on the screen for the window being processed by the routine, (b) the size or the number of the lines for the window, (c) the numeric priority level set by the user, (d) the default priority for the window, (e) a pointer to the beginning of the buffer which contains the text or information displayed in the window, (f) a pointer to the beginning of the buffer containing the display attribute information for each character in the window and (g) an offset into an array of structures, as seen in step 200 of FIG. 6A. The memory 52, FIG. 4, at the PDI circuit 30 contains the following information for each line on the terminal display screen 34, FIG. 3: (a) a pointer into the text buffer of the window associated with the line (the text pointed to is displayed on the line), (b) a pointer to the attributes associated with the text to display on the screen line, (c) the priority of the window associated with the displayed line and (d) the type of window having text displaying on the line. The hi_upd_scrinfo routine described in FIGS. 6A–6D is not run until the hi_upd_wdwinfo routine described in FIGS. 5A–5E has processed and stored all the information for each window on the screen. The hi_upd_scrinfo routine uses this information to determine the window information or text displayed on a particular line. This routine is executed for the window whose screen information is being updated. The hi_upd_scrinfo routine is run five times, once for each of the five windows in the preferred embodiment to update the information and format of the display screen 34, FIG. 3.

Figure 6A:
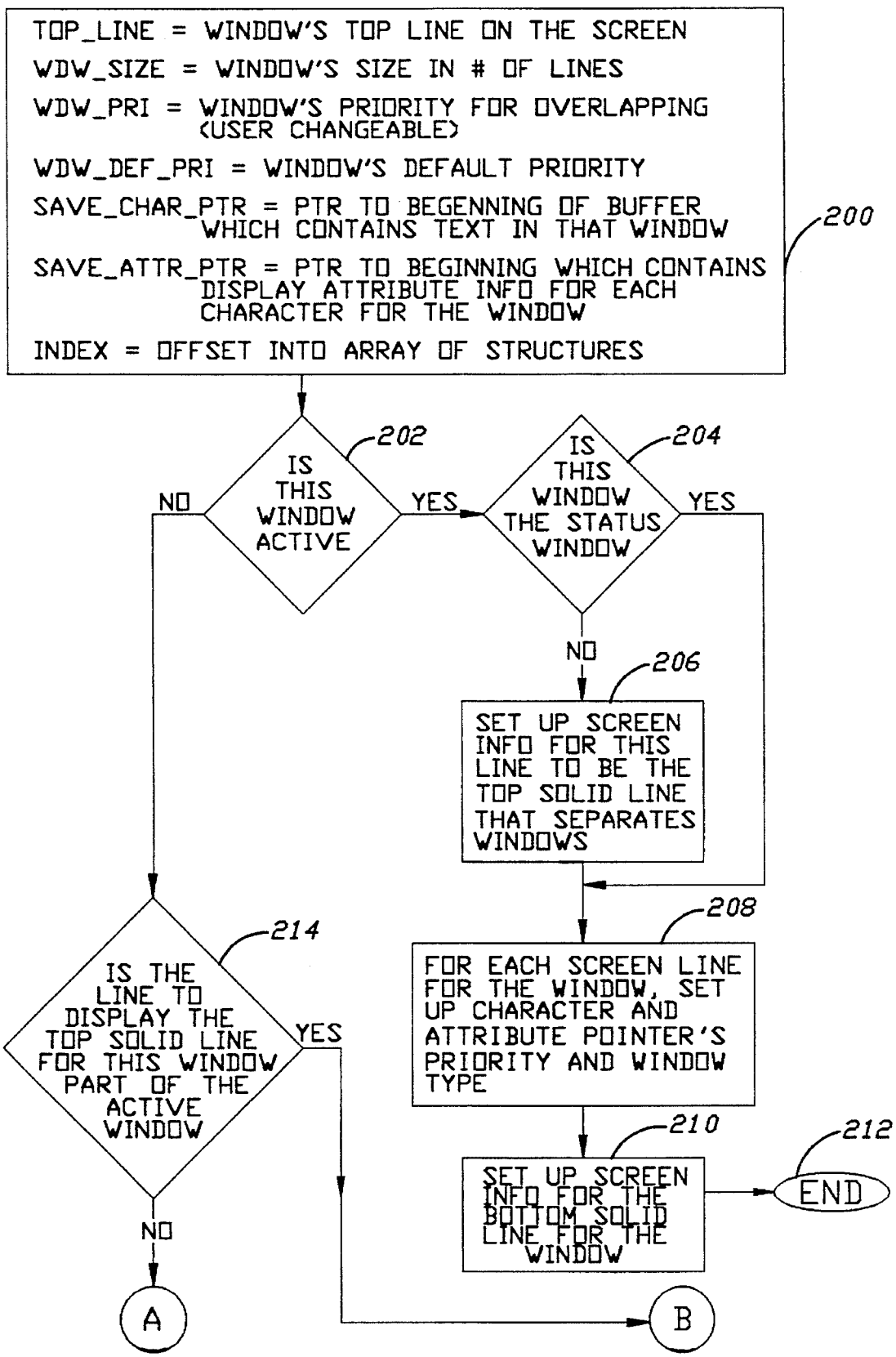
FIGS. 6A–6D is a composite flow chart of a computer program stored in the peripheral data interface card memory of FIG. 4 used to operate the data display terminal of FIG. 1 updating the display information for each line on the display screen.
Figure 6B:
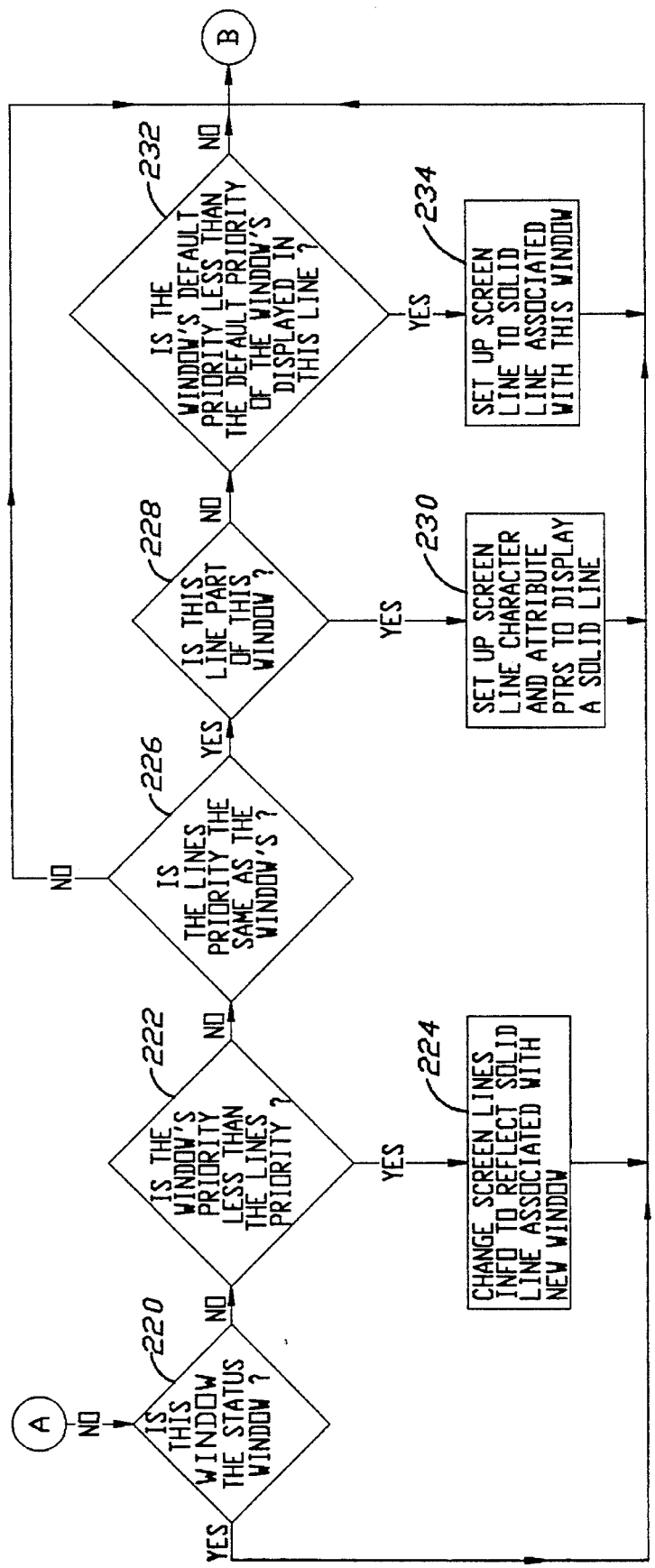

In step 202, FIG. 6A, the hi_upd_scrinfo routine determines if the window it is processing is an active window. If the window is active, then the entire window is displayed in the forefront of the CRT screen display 34, FIG. 3, and there is no need to determine the priority of the window.

In steps 204, FIG. 6A, the routine determines if the window is the status window 40, FIG. 3. If the window is not the status window 40, then in step 206, FIG. 6A, the top line for the window is set to be a top solid line 38 which separates the windows. If the window is the status window 40 then the routine proceeds to step 208, FIG. 6A, for the text and attribute pointers, the priority and window type to be read and set up for each screen line associated with the active window. In step 210, the screen information for the bottom solid line for the window is set up for display. In step 212, the routine for processing the active window ends.

If the window is not the active window, then in step 214, FIG. 6A, the hi_upd_scrinfo routine processes each line of the window to determine if there is any overlap with the active window. If the line to display is part of the active window, then the information for this line is not processed for display and the routine proceeds to step 240, FIG. 6C. If the top solid line for display is not part of the active window, then in step 220, FIG. 6B, the routine determines if the window being processed is the status window 40, FIG. 3. If the window is the status window 40, then the top line is line 1 and the routine proceeds to step 240. If the window is not the status window 40, then the hi_upd_scrinfo routine determines if the priority number of the window being processed is less than the priority of the line currently being displayed on the display screen 34 in step 222, FIG. 6B. If the priority number of the window being processed is less than the priority number of the displayed line, then the window being processed (or the new window) has priority over the displayed window, and the information for the screen line is changed to reflect a solid line 38, FIG. 3, associated with the new window, as seen in step 224. If the priority number for the window being processed is not less than the priority number for the displayed line, then in step 226 the routine determines if the priority of the window being processed is the same as the line being displayed. If the priority is not the same, then it is higher, and the hi_upd_scrinfo routine proceeds to step 240, FIG. 6C.

If the priority is not the same, then in step 228, a determination is made as to whether the line being displayed is part of the window being processed. If is part of the displayed window, then in step 230 the character and attribute pointers are prepared to display a solid line 38, FIG. 3, for the line being updated. If the line being updated is not part of the window being processed, then in step 232, FIG. 6B, a determination is made as to whether the default priority number of the window being processed is less than the default priority number of the window displayed on the line being updated. If the default priority for the window being process is less than the displayed line, then in step 234, the line being updated is changed to a solid line 38, FIG. 3, associated with the window being processed.

Figure 6C:
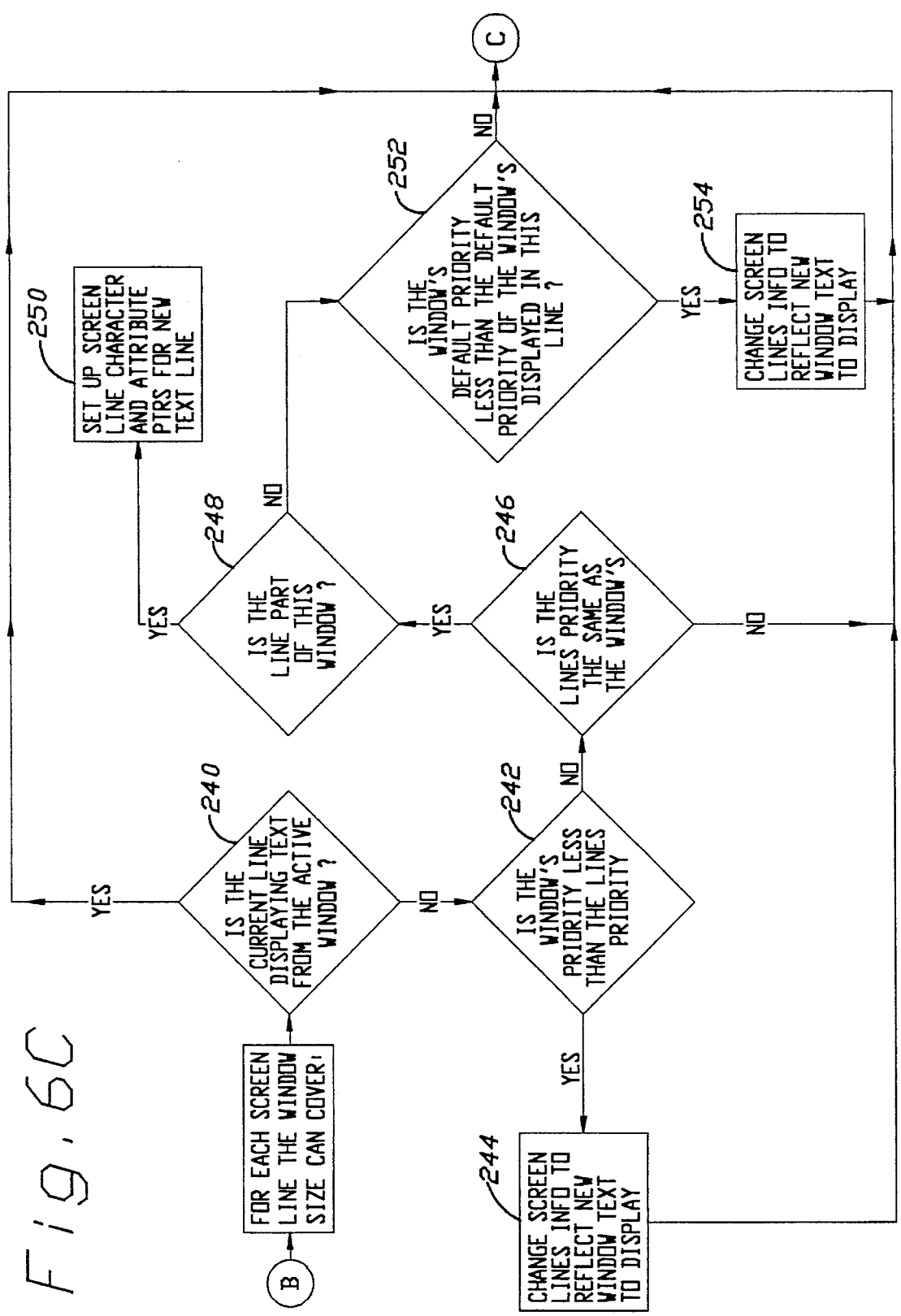
Figure 6D:
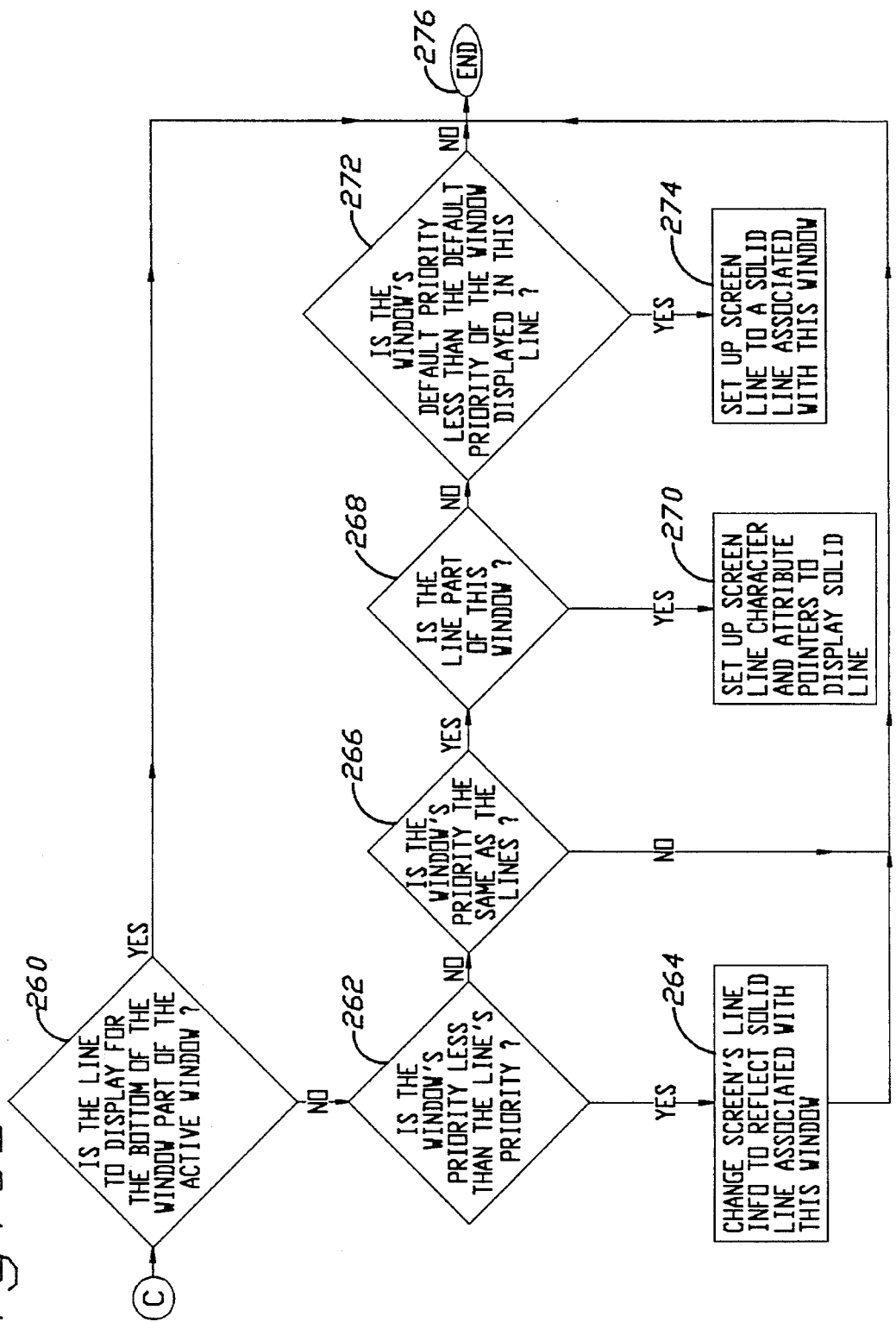

From step 240, FIG. 6C, to the end step 276, FIG. 6D, of the hi_upd_scrinfo routine, the following steps are performed for each screen line of the window being processed. In step 240, FIG. 6C, the hi_upd_scrinfo routine begins to process the text on the lines of the screen 34, FIG. 3, other than the top solid line of a window. In step 240, FIG. 6C, the routine determines if the current line displaying the text is part of the active window. If it is part of the active window, no further processing for this line takes place and the hi_upd_scrinfo routine proceeds to step 260, FIG. 6D. A determination is made in step 242, FIG. 6C, as to whether the priority of the window being processed is less than the displayed line, if the displayed line is not part of the active window. In step 244, the information on the line is changed to reflect the text for the window being processed, if the window has a lower priority number than the displayed line. If the processed window has a priority number which is not less than the priority number of the display line, then in step 246, hi_upd_scrinfo determines whether the processed window and the displayed line have the same priority. If they do not have the same priority, then the processing of the window for the text line ends, and the routine goes to step 260, FIG. 6D. If the priority number for the processed window and the displayed line are the same, then in step 248, hi_upd_scrinfo determines if the line is part of the window.

If the line is part of the window being processed, then in step 250, the character and attribute pointers are set up for display for the next text line. If the line is not part of the window, then in step 252, the hi_upd_scrinfo routine determines if the default priority for the processed window is less than the default priority of the window displayed on the line being updated. If the default priority for the processed window is less, then in step 254, the text information on the line of the screen 34, FIG. 3, line is changed to reflect the new display. If the default priority of the processed window is not less than the line being updated then the hi_upd_scrinfo routine proceeds to step 260 of FIG. 6D.

In step 260, FIG. 6D, the hi_upd_scrinfo routine determines if the bottom line for the window being processed part of the active window. If the bottom line for the window is part of the active window, then the line is not processed and the routine ends at step 276. If the bottom line of the window being processed is not part of the active window, then in step 262 the routine determines if the numeric priority for the window being processed is less than the priority of the displayed line. The displayed information or text is changed to reflect a solid line associated with the processed window in step 264, if the priority of the window is less than the priority of the line. In step 266, hi_upd_scrinfo determines whether the priority for the window being processed is the same as the updated line. If the priority is not the same, then it is higher, no overlapping of the window takes place, and the routine ends processing the window in step 276.

If the window and the line have the same priority, then in step 268 the display type for the window being processed is compared to the display type for the line. If the display types for the window and the line are the same, the pointers to the character and the attribute information are updated to display a solid bottom line in step 270. If the line is not part of the window being processed, then in step 272 the default priorities for the window and the displayed line are compared. If the default priority for the window is numerically lower than that of the line, then in step 274 the pointer information for the line is set to display a solid line associated with the window. The priority of the line is set to the priority of the window and the display type is set to that of the window. If the default priority of the window being processed is not less than that of the window currently displayed in the line, then in step 276 the hi_upd_scrinfo routine is exited with the information for the screen line being updated.

While a detailed description of the preferred embodiment of the invention has been given, it should be appreciated that many variations can be made thereto without departing from the scope of the invention as set forth in the appended claims.

We claim:

1. In an automatic call distributor having a multiport switch controlled by a central processing unit for interconnecting external telephonic units of an external telephonic network with internal telephonic units of the call distributor and a plurality of data display terminals each with a display screen coupled with the automatic call distributor for displaying information concerning automatic call distributor activities, the improvement being a programmable data window display system, comprising:

means for storing a plurality of different types of information for display;

means at one of the display terminals for selectively displaying the different types of information at different window areas including an active window area and a plurality of nonactive window areas of the display screen of the one data display terminal;

means for establishing a default priority for all of said plurality of data display terminals relating to the order in which the window areas are displayed; and means at one of the display terminals for overriding the default priority for selectively changing a predetermined priority of the window areas of said one display terminal to one differing from the default priority in response to a command entered at the one display terminal to change the order in which the nonactive window areas overlap on the display screen of said one terminal when there is insufficient room on the screen for full simultaneous display of the active window area and the nonactive window areas.

2. The automatic call distributor of claim 1 including means at the display terminal for selecting one of the plurality of window areas to be active, and means responsive to the active window area selecting means to display all the information of the active window area on the display screen over another window area regardless of the relative priority of the other window area.

3. The automatic call distributor of claim 1 in which the storing means includes a plurality of memory buffers respectively associated with the plurality of window areas.

4. The automatic call distributor of claim 3 in which each of said memory buffer stores for each of the plurality of window areas at least one of the types of information of (a) the size of the window area, (b) the top line of the display screen on which the window area appears, (c) the numeric priority, (d) the numeric default priority, (e) a pointer to a buffer for the window area in which the text displayed on the screen is stored, and (f) a pointer to a display attribute buffer which contains an attribute for each character in a text buffer.

5. The automatic call distributor of claim 4 in which each of said buffers stores all the types of information (a)–(f).

6. The automatic call distributor of claim 4 in which each of the memory buffers stores for each line of the associated window area both text type of information and attribute type of information.

7. The automatic call distributor of claim 4 in which each of said memory buffers stores for each line on the display screen at least one of (a) a pointer into the text buffer of the window area associated with the line to select the text displayed on the screen, (b) a pointer to an attribute associated with the text selected for display on the screen, (c) a priority number of the window area having text displayed on the line and (d) a type of window area that has the text displayed on the associated line.

8. The automatic call distributor of claim 3 in which each of said memory buffer stores for each line on the display screen at least one of the types of information of (a) a pointer into the associated text buffer of the window area to select the text displayed on the screen, (b) a pointer to the attribute associated with the text selected for display on the screen, (c) the numeric priority, or priority number, of the window area having text displayed on the line and (d) the type of window area that has the text displayed on the associated line.

9. The automatic call distributor of claim 1 including means at the data display terminal for changing the size of at least one of the plurality of window areas on the display screen.

10. The automatic call distributor of claim 9 including means at the data display terminal for changing the location of the at least one window area.

11. The automatic call distributor of claim 1 including means at the data display terminal for changing the location of at least one of the window areas.

12. The automatic call distributor of claim 1 including means for detecting the selection of a priority for one window area which is equal to that of another window area as an invalid priority selection.

13. In an automatic call distributor having a multiport switch controlled by a central processing unit for interconnecting external telephonic units of an external telephonic network with internal telephonic units of the call distributor and a plurality of data display terminals each with a display screen coupled with the automatic call distributor for displaying information concerning activities within the automatic call distributor, the improvement being a method of selectively programming data window displays, comprising the steps of:

storing a plurality of different types of information for display;

selectively displaying at one of the data display terminals the different types of information at different window areas including an active window area and a plurality of nonactive window areas of the display screen of the one data display terminal;

establishing a default priority for all of said plurality of data display terminals relating to the order in which the window areas are displayed; and overriding the default priority at one of the display terminals for selectively changing a predetermined priority of the window areas of said one display terminal to one differing from the default priority in response to a command entered at the one display terminal to change the order in which the nonactive window areas overlap on the display screen on said one terminal when there is insufficient room on the screen for full simultaneous display of the active window area and all the nonactive window areas.

14. The method of claim 13 including the steps of selecting one of the plurality of window areas to be active, and displaying all the information of the active window area on the display screen over another window area regardless of the relative priority of the other window area.

15. The method of claim 13 including the step of storing includes storing the plurality of different types of information in a plurality of memory buffers respectively associated with the plurality of window areas.

16. The method of claim 15 including the step of storing in said memory buffer for each of the plurality of window areas at least one of the types of information of (a) the size of the window area, (b) the top line of the display screen on which the window area appears, (c) the numeric priority, (d) the numeric default priority, (e) a pointer to a buffer for the window area in which the text displayed on the screen is stored, and (f) a pointer to a display attribute buffer which contains an attribute for each character in the text buffer.

17. The method of claim 16 in which each of said buffers stores all the types of information (a)–(f).

18. The method of claim 16 in which each of the associated buffers stores for each line of the associated window both text type of information and attribute type of information.

19. The method of claim 15 in which each of said memory buffer stores for each line on the display screen at least one of the types of information of (a) a pointer into the associated text buffer of the window to select the text displayed on the screen, (b) a pointer to the attribute associated with the text selected for display on the screen, (c) the numeric priority, or priority number, of the window area having text displayed on the line and (d) the type of window area that has the text displayed on the associated line.

20. The method of claim 13 including the step of changing the size of at least one of the plurality of window areas on the display screen.

21. The method of claim 20 including the step of changing the location of the at least one window area.

22. The method of claim 13 including the step of changing the location of at least one of the window areas.

23. The method of claim 13 including the step of detecting the selection of a priority for one window area which is equal to that of another window area as an invalid priority selection.

* * * * *